April 21, 1970

A. H. WILLINGER 3,507,253

AQUARIUM AIR STONE ORNAMENT

Filed Oct. 7, 1968

INVENTOR.
ALLAN H. WILLINGER
BY
Friedman & Goodman
Attorneys

United States Patent Office 3,507,253
Patented Apr. 21, 1970

---

3,507,253
AQUARIUM AIR STONE ORNAMENT
Allan H. Willinger, New Rochelle, N.Y., assignor to Aquariums Incorporated, Maywood, N.J., a corporation of Delaware
Filed Oct. 7, 1968, Ser. No. 765,575
Int. Cl. A01k 63/00
U.S. Cl. 119—5   3 Claims

ABSTRACT OF THE DISCLOSURE

An aquarium air stone ornament for which the usual air pump conduit connection is made to a connector partially projected into an air passage provided in the porous "air stone" body, the connector having a laterally extending disk-like member which covers and peripherally extends beyond the air passage and is adhesively secured along this extending or overlapping area to the air stone, the adhesive thus making the connection between the connector and air stone and also sealing this connection against leakage.

---

The present invention relates generally to aquarium ornaments such as are used to hold the air supply conduit of an aquarium artificial aeration system in a submerged condition, and more particularly to an improved so-called air stone aquarium ornament.

As generally understood, there is a constant need to enrich the oxygen content of the water of an aquarium, as by continuously pumping and bubbling air through the water. The implementation of this so-called artificial aeration of the water body obviously necessitates maintaining the remote or free end of the air pump conduit in a submerged condition within the aquarium and is usually achieved by attaching this conduit end to an aquarium ornament. One such ornament in wide use is a compressed granular body, commonly referred to as an "air stone," which by virtue of its porous construction is effective in causing the release of the stream of air supplied to it in the more desirable form as small, numerous bubbles. In presently known aquarium air stone ornaments the connector for making the air pump conduit connection is usually adhesively secured to the air stone and, invariably, the adhesive inadvertently causes blockage of an air passage, or else the connection achieved is ineffective to prevent excessive air leakage which is not in the form of desirable small, aeration bubbles. Also, where a rigid tube, adhesively secured in place within an air passage of the air stone, is used to complete the connection to the conduit, the stress of connecting and disconnecting the air pump conduit and rigid tube often results in chipping of the portion of the air stone bounding the rigid tube.

Broadly, it is an object of the present invention to provide an improved aquarium ornament overcoming the foregoing and other shortcomings of the prior art. Specifically, it is an object to provide an improved aquarium air stone ornament in which the adhesive coating connecting the connector and air stone is also effective as a sealing medium minimizing air leakage from the ornament, except of course for the release through the air stone as aeration bubbles.

An aquarium air stone ornament demonstrating objects and advantages of the present invention includes a porous "air stone" having a combination mounting opening and air passage into its interior, and a connector for achieving connection to the air pump conduit projected into this air passage, the connector having a laterally extending disk-like member which covers and peripherally extends beyond the air passage. An adhesive coating at the interface of the contacting surfaces of the air stone and connector disc-like member completes the connection therebetween in a manner minimizing air leakage from between these contacting surfaces.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 2:
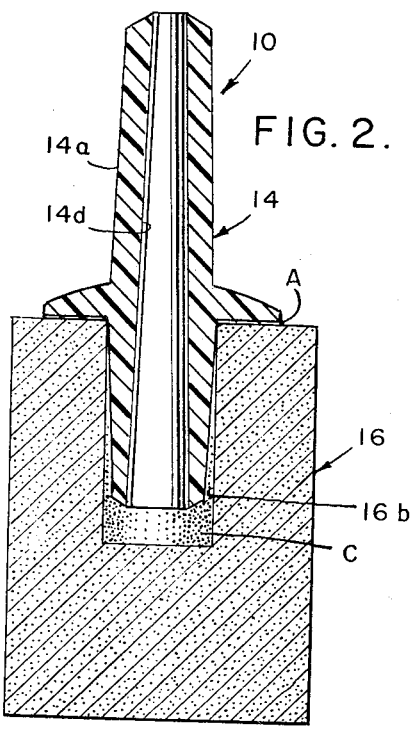
FIG. 2 is an elevational view similar to FIG. 1 but illustrating the connector and aquarium air stone in their combined conditions and further in section, taken on line 2—2 of FIG. 4, to better illustrate further structural features thereof.
Figure 3:
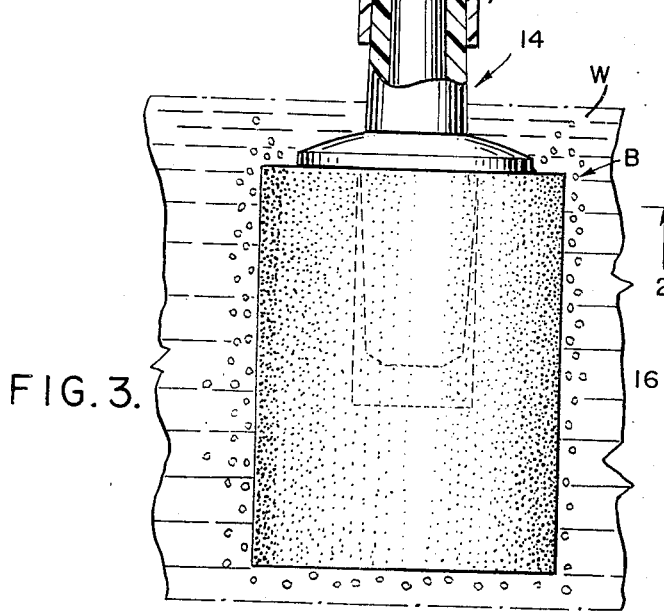
FIG. 3 is an elevational view, with portions in section to better illustrate structural features thereof, of the combined connector and aquarium air stone in an operative submerged condition within an aquarium body of water.
Figure 4:
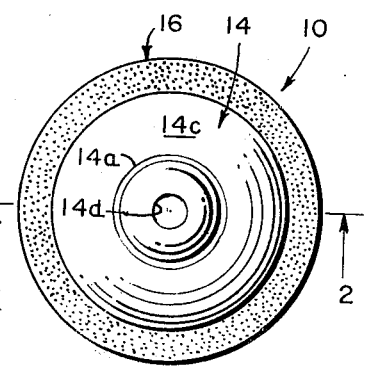
FIG. 4 is a plan view of the combined connector and air stone as projected from FIG. 2.

Reference is now made to the drawings and in particular to FIGS. 2–4, wherein there is shown a combined connector and porous body or so-called "air stone," effectively serving as an aquarium ornament and herein generally designated 10. As generally understood and as illustrated in FIG. 3, an air pump supply conduit 12 is conected at one end to the ornament 10, which thereupon effectively maintains the conduit 12 in a submerged condition within a body of water W within the aquarium tank and, in turn, permits the introduction of air into the body of water W through the conduit 12, this air being more particularly introduced as numerous and discreet bubbles B and thus in the most advantageous form for providing so-called artificial aeration of the water body W as is necessary to sustain fish and plant life. To this end, ornament 10 consists essentially of two significant parts, namely, a connector 14 for achieving a connection to the air pump conduit 12 and an attached body 16 formed of sand or similar material produced under compression in a well understood manner, and thereby providing a porous construction through which the air supply conduit 12 is introduced into the water body W, the porosity of the body 16 being effective in an obvious manner to break up the air stream into the discreet, numerous bubbles B as previously noted. While ornament 10 in the general form of an air stone as herein described is already well known, the unique cooperating specific structural features thereof, particularly of the connector 14 and porous body 16 which forms the connection therebetween, is not known and is the essential inventive contribution.

Figure 1:
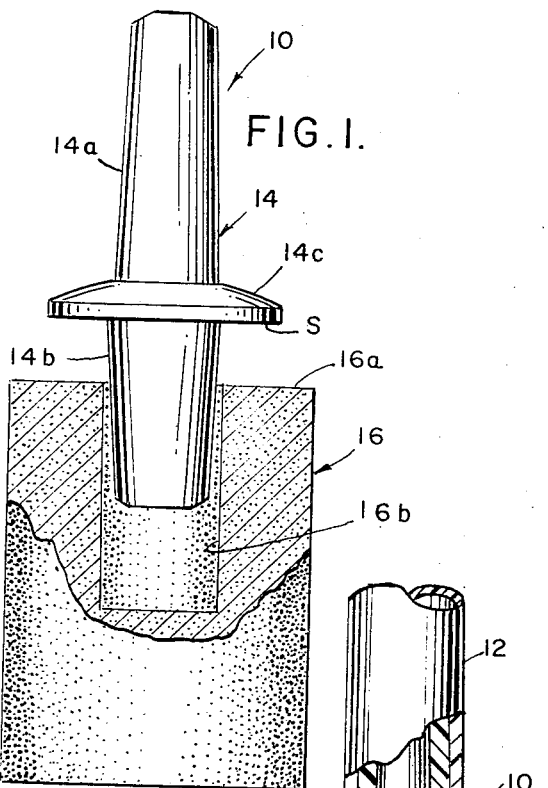
FIG. 1 is an elevational view illustrating the positioning of a connector within an aquarium air stone, the upper portion of the connector being in longitudinal section to better illustrate structural features thereof.

Specifically and as may best be understood by progressive examination of FIGS. 1, 2, connector 14, preferably a plastic injection molded article of manufacture, has a generally elongated, tubular body including an upper end 14a and a lower depending end 14b, these two ends of the body being delineated from each other by a laterally extending disk-like sealing member 14c, which, in the operative mounted position of the connector 14 on the body 16 presents a downwardly facing sealing surface S in facing relation to an upper sealing surface 16a of the body 16. Both connector ends 14a, 14b are slightly tapered to facilitate, in an obvious manner, the placement of the conduit 12 over the upper end 14a and the insertion of the other depending end 14B within a centrally located air passage 16b of the porous body 16, the passage 16b originating in the surface 16a and extending, as clearly illustrated in FIGS. 1–3, approximately to the medial portion of the body 16. Air passageway 16b is generally cylindrical in cross section to thereby accommodate the similarly cylindrically shaped connector depending end 14b.

The positioning of the connector 14 on the body 16, as just described and as illustrated in FIG. 2, naturally brings in contact the sealing surface S and the body upper surface 16a. In accordance with the present invention, in order to complete the connection of the connector 14 to the air body 16, an adhesive coating A is advantageously applied at the interface of the surfaces S, 16a and thus connection is achieved in a manner which cannot adversely affect the operation of the ornament 10. This is in contrast to prior art aquarium air stone ornaments in which an adhesive is also used to join the connector to the air stone but such adhesive usually occupies a position adjacent the air passage of the connector and, as a consequence, in some instances inadvertently produces clogging of this air passage. As clearly shown in FIG. 2, however, the connector longitudinal air passage 14d is effectively isolated from the adhesive coating A.

It should be noted that the outwardly flaring lower end of the air passage 14d opens into a chamber C formed in the lower end of the air passage 16 by virtue of this passage being of greater depth than the length of the connector lower depending end 14b as measured from its free end to the sealing member sealing surface S which comes in seating contact with the body upper surface 16a during the positioning of the connector 14 on the body 16. Thus, in the operation of the aquarium air stone ornament 10, air is introduced through the air pump conduit 12 through the conductor 14 to the centrally located chamber C within the body 16, and under pressure of the air pump, is forced from this chamber through the porous structure of the body 16 exiting therefrom in the form of bubbles B. In this way, the aquarium water body W is effectively artificially aerated by the body 16 which also serves as a weight to effectively maintain the air conduit 12 in its required submerged condition within the water body W. Further, the previously noted adhesive coating A not only connects the connector 14 and the porous body 16 but also has been found to be effective as a sealing medium which minimizes any air leakage from between the connected sealing surfaces S, 16a.

A latitude of modification, change and substitution is intended in the foregoing disclosure and in some instances some features of the invention will be employed without a corresponding use of other features.

What is claimed is:

1. An aquarium air stone ornament comprising, in combination, a porous body serving as said air stone having an external first sealing surface provided with an air passage extending to the interior of said body, and an air conduit connector having a hollow body and a laterally extending sealing member thereon presenting a downwardly facing second sealing surface and delineating a lower depending end on said connector body, said connector having an operative mounted position on said air stone with said lower depending end disposed in said body air passage and said first and second sealing surfaces in contact with each other, and an adhesive at the interface of said first and second sealing surfaces effective to connect said connector and said air stone and minimize air leakage from occurring between said first and second sealing surfaces.

2. An aquarium air stone ornament as defined in claim 1 wherein the depth of said body air passage is of a greater extent than the extent of said connector lower depending end.

3. An aquarium air stone ornament as defined in claim 2 wherein said connector lower depending end is tapered to facilitate placement thereof in said body air passage.

References Cited
UNITED STATES PATENTS

| | | | |
|---|---|---|---|
| 754,317 | 3/1904 | Kaltenegger et al. | 119—5 |
| 2,008,363 | 7/1935 | Maris | 119—5 |
| 3,261,471 | 7/1966 | Halpert | 119—5 X |

ALDRICH F. MEDBERY, Primary Examiner